United States Patent
Ahn et al.

(10) Patent No.: US 7,218,450 B2
(45) Date of Patent: May 15, 2007

(54) LIGHT DIFFUSING FILM

(75) Inventors: Cheol Heung Ahn, Cheonan (KR); Chi Uk Moon, Cheonan (KR)

(73) Assignee: SKC Co. Ltd., Suwon, Kyungki-do (KR)

(*) Notice: Subject to any disclaimer, the term of this patent is extended or adjusted under 35 U.S.C. 154(b) by 261 days.

(21) Appl. No.: 10/482,366

(22) PCT Filed: Jun. 30, 2001

(86) PCT No.: PCT/KR01/01130

§ 371 (c)(1),
(2), (4) Date: Jun. 8, 2004

(87) PCT Pub. No.: WO03/005072

PCT Pub. Date: Jan. 16, 2003

(65) Prior Publication Data

US 2004/0246584 A1   Dec. 9, 2004

(51) Int. Cl.
*G02B 5/02* (2006.01)
(52) U.S. Cl. .............. 359/599; 349/112; 362/355; 428/323
(58) Field of Classification Search .............. None
See application file for complete search history.

(56) References Cited

U.S. PATENT DOCUMENTS

| | | | | |
|---|---|---|---|---|
| 5,847,795 A | * | 12/1998 | Satoh et al. | 349/137 |
| 5,869,128 A | * | 2/1999 | Meulendijks et al. | 427/64 |
| 6,217,176 B1 | * | 4/2001 | Maekawa | 359/601 |
| 6,852,396 B1 | * | 2/2005 | Mineo | 428/212 |

FOREIGN PATENT DOCUMENTS

| | | |
|---|---|---|
| JP | 5-73602 | 10/1993 |
| JP | 7-174909 | 7/1995 |
| JP | 2000-39506 | 2/2000 |
| WO | WO 200017676 A1 * | 3/2000 |

* cited by examiner

*Primary Examiner*—Arnel Lavarias
(74) *Attorney, Agent, or Firm*—Nixon & Vanderhye PC

(57) ABSTRACT

A light diffusing film which is excellent in luminance uniformity and which exhibits no partial deterioration in light transmittance, thereby eliminating the formation of black spots. The light diffusing film, which has a monodisperse light diffuser and a light diffusing layer consisting of a light diffuser and a binder resin on one plane of a base, in which the lamination ratio is 10% or less and the diameter of flocculated particles in the light diffuser is 50 μm or less, exhibits excellent luminance and thermal properties, so that it can be suitably used in various kinds of picture display devices, in particular, in a display device employing LED (light emitting diode) lamps or an LCD (liquid crystal display device) backlight system.

4 Claims, 1 Drawing Sheet

LIGHT DIFFUSING FILM

TECHNICAL FIELD

The present invention relates to a light diffusing film, and more particularly, to a light diffusing film which is excellent in luminance uniformity and which exhibits no partial deterioration in light transmittance, thereby eliminating the formation of black spots.

BACKGROUND ART

In industry, polymeric resin films have a wide variety of applications including bases for packing, photographic films, condensers, electric insulators, labels, magnetic recording media, medical purposes. In recent years, polymeric resin films have also been in widespread use as base materials for picture display devices such as rear projection type screens, plasma display panels or liquid crystal display devices.

In particular, since a picture display device, unlike a cathode ray tube, adopts an indirect illumination system in which light irradiated from a fluorescent tube of a backlight provided on the backside of the device is reflected to a metal deposition layer or semi-transparent or opaque, white reflecting plate to display a picture through a light guide plate, visibility is poor, which becomes worsened according to pursuit of larger display devices.

To overcome the above-described problem, a light diffusing film that is adhered to a light guide plate to increase luminance by uniformly diffusing light, has been developed.

For example, Japanese laid-open patent Nos. hei 6-67003, 7-174909 and 9-127314, U.S. Pat. No. 5,706,134 and Japanese Utility Model No. 2,539,491 disclose light diffusing films having a transparent binder resin solution in which inorganic or organic particles are dispersed, coated on one surface of a transparent polymeric resin film as a light diffuser.

Here, either an inorganic light diffuser or an organic light diffuser may be used as the light diffuser of the present invention. Examples of the inorganic light diffuser include silica, zirconia, calcium carbonate, barium sulfate, glass, titanium dioxide, and so on, and examples of the organic light diffuser include fine particles of urethane based resins, acryl based resins, vinyl chloride based resins, and so on.

The diameter of the light diffuser is typically in the range of 1 to 50 μm. In order to maximize the formed of a poly of the light diffuser per unit area, particles having different particle sizes are generally used.

Also, in order to increase diffusion transmittance, there has been an attempt to maximize the ratio of a light diffuser to a transparent binder resin. However, in such a light diffusing layer, light diffusing materials cannot exist independently but flocculate with one another or exist in the form of laminates.

Figure 3:
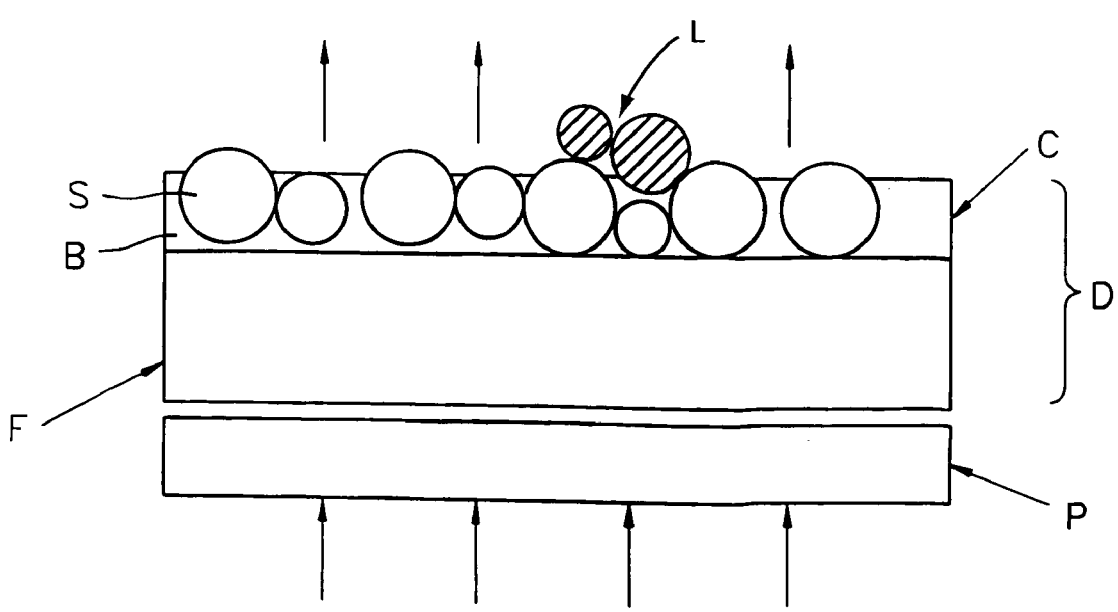

FIG. 3 is a cross-sectional view of a conventional light diffusing film. The transmittance of light transmitted through a light guide plate P is lowered at a portion L where light diffuser particles S are laminated. In particular, the transmittance is noticeably reduced at a portion where the particles are flocculated. Thus, there is a limit in improving the uniformity in luminance. Also, black spots are easily visible by naked eye, which makes the conventional light diffusing film unsuitable as a light diffusing film.

DISCLOSURE OF THE INVENTION

To solve the above-described problems, it is an object of the present invention to provide a light diffusing film having excellent luminance uniformity while exhibiting no partial deterioration in light transmittance and generating no black spots.

To accomplish the above object, there is provided a light diffusing film having, on at least one surface of a base film, a light diffusing layer made of an inorganic or organic light diffuser and a binder resin, wherein the lamination ratio is represented by the formula 1 and the size of flocculated particles in the laminated light diffuser is represented by the formula 2:

$$\text{Lamination ratio} = \frac{\pi \times S(\mu m) \times \text{Number of laminated particles}}{480\ \mu m \times 480\ \mu m} \times 100(\%) \leq 10\%, \quad \text{[Formula 1]}$$

$$\text{Diameter of flocculated particles} = S(\mu m) \times \text{Number of flocculated particles} \leq 50\mu m \quad \text{[Formula 2]}$$

wherein S denotes the average particle diameter of the light diffuser.

The light diffuser is preferably made of one or more kinds of monodisperse particles. If two kinds of monodisperse particles are mixed in the light diffuser, the following formula 3 are satisfied:

$$Sa^{1/2} < Sb < Sa \quad \text{[Formula 3]}$$

wherein Sa denotes the average particle diameter of a relatively larger light diffuser particle and Sb denotes the average particle diameter of a relatively smaller diffuser particle. If two kinds of monodisperse particles are mixed in the light diffuser, the coating amount is preferably in the range of 5 to 25 to 25 g/m². Also, an average particle diameter of the light diffuser is in the range of 1 to 50 μm.

BEST MODE FOR CARRYING OUT THE INVENTION

In a light diffusing film D of the present invention, having a light diffusing layer C consisting of an inorganic or organic light diffuser S and a binder resin B on one plane of a base F made of a polymeric resin film, the light diffuser is one of the most influential factors in determining the luminance of the light diffusing layer according to its diffused state, kind and particle size. Particularly, the diffused state is the most important factor in determining the luminance of the light diffusing layer. If the light diffuser is diffused nonuniformly or flocculated, the lamination ratio may exceed 10% resulting in a considerable reduction in light transmittance due to flocculated particles.

Even if the lamination ratio is 10% or less, flocculation of laminated light diffuser particles of greater than 50 μm in size may cause a reduction in light transmittance.

There are various techniques of adjusting the lamination ratio to be 10% or less and the size of flocculated particles to be 50 μm or less.

Figure 1:
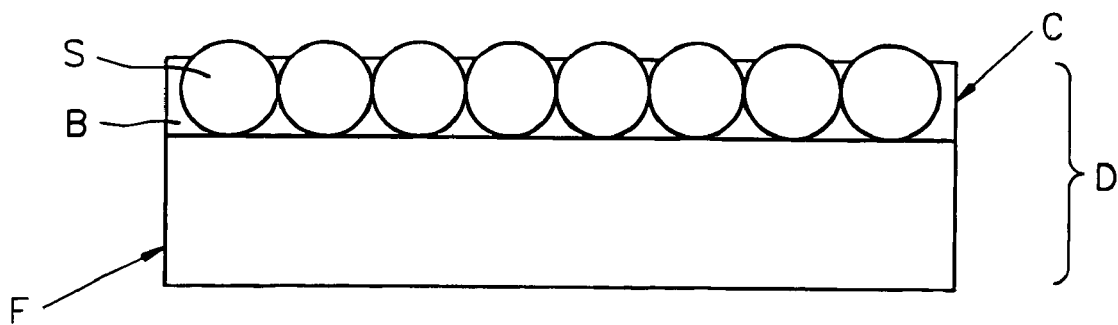

Referring to FIG. 1, which is a cross-sectional view of a light diffusing film according to an embodiment of the present invention, the light diffusing film is formed of a light diffusing layer satisfying the formulas 1 and 2.

In this case, a single-layered light diffusing layer can be obtained by coating the light diffuser to a uniform thickness corresponding to the particle diameter, and the light diffuser has preferably monodisperse form.

In order to maximize the luminance of the light diffuser by increasing the formed of a poly of the same in a desirable range of the present invention, two kinds of light diffusers which are different in average particle size are preferably used in combination so as to satisfy the formula 3:

$$Sa^{1/2} < Sb < Sa \quad \text{[Formula 3]}$$

wherein Sa denotes the average particle diameter of a relatively larger light diffuser particle and Sb denotes the average particle diameter of a relatively smaller diffuser particle.

Preferably, the mixture ratio of particles having an average particle diameter of Sa to particles having an average particle diameter of Sb is in the range of 10:90 to 90:10.

Figure 2:
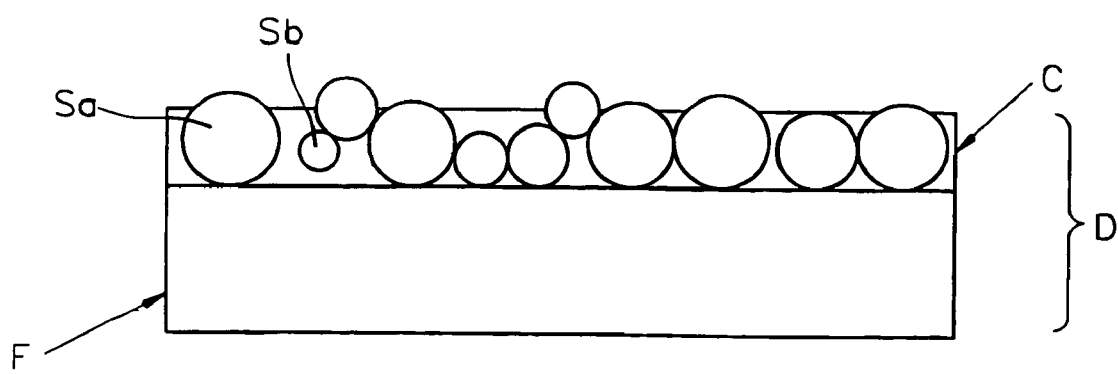

FIG. 2 is a conceptual diagram of a light diffusing film according to another embodiment of the present invention. Referring to FIG. 2, a light diffusing layer satisfying the formulas 1, 2 and 3 is formed of another monodisperse particles.

Here, an average particle size of the light diffuser is preferably in the range of 1 to 50 μm. If the average particle size of the light diffuser is less than 1 μm, monodispersion is difficult to achieve, which makes light diffuser particles prone to flocculation. Also, the lamination ratio may exceed 10%. If the average particle size of the light diffuser is greater than 50 μm, monodispersion is easily achieved but interparticle attraction becomes strong so that flocculation is likely to occur again after monodispersion. Also, the light transmittance may be reduced.

In the case of using light diffusers having different particle diameters satisfying the formulas 3, the coating amount is preferably in the range of 5 to 25 g/m². If the coating amount is less than 5 g/m², which makes the film too thin, the light diffusing effect is negligible. If the coating amount is greater than 25 g/m², the lamination ratio exceeds 10%, resulting in a reduction of light transmittance, which is disadvantageous from the viewpoint of practicality as a light diffusing plate.

The light diffusing film satisfying the above-described requirements can be manufactured by general film making methods.

First, a light diffusing composition containing a light diffuser and a binder resin is dispersed using a general disperser such as a bead miller using glass or zirconium beads or a roll miller using horizontal or vertical rolls.

In order to promote dispersion, a diffuser containing denatured polysiloxane or polycarboxylic acid may be used.

The binder resin solution having light diffusers uniformly dispersed, is coated on a base film, preferably a PET film, and dried to thus form a light diffusion layer.

Methods of coating a light diffusing composition on a base film include methods generally known in the art without limitation, and usable coating methods include air knife coating, gravure coating, reverse roll coating, spray coating and blade coating.

After the base film is coated with the light diffusing composition, the resultant structure is heated by irradiating hot air, infrared rays or far infrared rays, thereby forming a coating layer.

The term "monodisperse light diffuser" used throughout the specification means a light diffuser in which approximately 95% of the light diffuser particles are within the range of ±15% in terms of an average particle size of the light diffuser.

The present invention will now be described more fully with reference to the following examples. The invention may, however, be embodied in different forms and should not be construed as limited to the examples set forth herein. Rather, these examples are provided so that this disclosure will be thorough and complete, and will fully convey the scope of the invention to those skilled in the art.

EXAMPLE 1

A light diffusing composition having the following constituents was coated on a 100 μm thick PET film (Model No. SH31 of SKC Co., Ltd., Korea) at a dose of 15 g/m² using a 0.3 mm myer bar and dried at 120° C. for 3 minutes, thereby manufacturing a light diffusing film having a lamination ratio of 1.2% and a flocculated particle diameter of 20 μm. Then, the black spots and luminance characteristic of the manufactured light diffusing film were evaluated, and the results thereof are listed in Table 1.

| | |
|---|---|
| Binder resin (Nipporan 125, Nippon Polyurethane Co.) | 25.4 parts by weight |
| Curing agent (Coronate HX, Nippon Polyurethane Co.) | 2.9 parts by weight |
| Monodisperse polymethylmethacrylate light diffuser (MX-1000 having an average particle diameter of 10 μm, Soken Chemical Co., Ltd.) | 30.3 parts by weight |
| Solvent (MEK:toluene = 1:1) | 41.4 parts by weight |

EXAMPLE 2

A light diffusing film having a lamination ratio of 2.7% and a flocculated particle diameter of 25 μm was prepared from the following composition by the same equipment and method as in Example 1. Then, the black spots and luminance characteristic of the prepared light diffusing film were evaluated, and the results thereof are listed in Table 1.

| | |
|---|---|
| Binder resin (Nipporan 125, Nippon Polyurethane Co.) | 25.4 parts by weight |
| Curing agent (Coronate HX, Nippon Polyurethane Co.) | 2.9 parts by weight |
| Monodisperse polymethylmethacrylate light diffuser (MX-1000 having an average particle diameter of 10 μm, Soken Chemical Co., Ltd.) | 21.2 parts by weight |
| Monodisperse polymethylmethacrylate light diffuser (MX-500 having an average particle diameter of 5 μm, Soken Chemical Co., Ltd.) | 21.2 parts by weight |
| Solvent (MEK:toluene = 1:1) | 41.4 parts by weight |

EXAMPLE 3

A light diffusing film having a lamination ratio of 0.8% and a flocculated particle diameter of 30 μm was prepared from the following composition by the same equipment and method as in Example 1. Then, the black spots and luminance characteristic of the prepared light diffusing film were evaluated, and the results thereof are listed in Table 1.

| | |
|---|---|
| Binder resin (Nipporan 125, Nippon Polyurethane Co.) | 25.4 parts by weight |
| Curing agent (Coronate HX, Nippon Polyurethane Co.) | 2.9 parts by weight |

-continued

| | |
|---|---|
| Monodisperse polymethylmethacrylate light diffuser (MX-1500 having an average particle diameter of 15 μm, Soken Chemical Co., Ltd.) | 30.3 parts by weight |
| Solvent (MEK:toluene = 1:1) | 41.4 parts by weight |

COMPARATIVE EXAMPLE 1

A light diffusing film having a lamination ratio of 30.2% and a flocculated particle diameter of 90 μm was prepared from the following composition by the same equipment and method as in Example 1. Then, the black spots and luminance characteristic of the prepared light diffusing film were evaluated, and the results thereof are listed in Table 1.

| | |
|---|---|
| Binder resin (Nipporan 125, Nippon Polyurethane Co.) | 25.4 parts by weight |
| Curing agent (Coronate HX, Nippon Polyurethane Co.) | 2.9 parts by weight |
| Monodisperse polymethylmethacrylate light diffuser (Epostart MA-1010 having an average particle diameter of 0.03 to 26 μm, Japan Catalyst Co., Ltd.) | 30.3 parts by weight |
| Solvent (MEK:toluene = 1:1) | 41.4 parts by weight |

COMPARATIVE EXAMPLE 2

A light diffusing film having a lamination ratio of 21.5% and a flocculated particle diameter of 81 μm was prepared from the following composition by the same equipment and method as in Example 1. Then, the black spots and luminance characteristic of the prepared light diffusing film were evaluated, and the results thereof are listed in Table 1.

| | |
|---|---|
| Binder resin (Nipporan 125, Nippon Polyurethane Co.) | 25.4 parts by weight |
| Curing agent (Coronate HX, Nippon Polyurethane Co.) | 2.9 parts by weight |
| Monodisperse polymethylmethacrylate light diffuser (MX-1500 having an average particle diameter of 15 μm, Soken Chemical Co., Ltd.) | 21.2 parts by weight |
| Monodisperse polymethylmethacrylate light diffuser (MX-150 having an average particle diameter of 1.5 μm, Soken Chemical Co., Ltd.) | 9.1 parts by weight |
| Solvent (MEK:toluene = 1:1) | 41.4 parts by weight |

<Evaluation>

Lamination Ratio

Two or three sheets of light diffusing films were laminated on a light guide plate of a liquid crystal backlighting unit and then observed using an optical microscope at a 500 times magnification to calculate the lamination ratio represented by the formula 1.

Maximum Diameter of Flocculated Particles

Two or three sheets of light diffusing films were laminated on a light guide plate of a liquid crystal backlighting unit and then observed using an optical microscope at a 500 times magnification to calculate the particle diameter represented by the formula 2.

Black Spots

Two or three sheets of light diffusing films were laminated on a light guide plate of a liquid crystal backlighting unit and then observed using an optical microscope at a 14 times magnification to identify black spots by naked eye. The quality (goodness or badness) of the films was rated as having one of the following grades:

good: neither dots nor black spots caused by lamination were found;

poor: dots or black spots caused by lamination were found.

Luminance

Two or three sheets of light diffusing films were laminated on a light guide plate of a liquid crystal backlighting unit and then the luminance was measured using a luminance meter BM-7 available from TOPCON Co., Ltd.

TABLE 1

| | Example 1 | Example 2 | Example 3 | Comparative Example 1 | Comparative Example 2 |
|---|---|---|---|---|---|
| Sa (μm) | 10 | 10 | 12 | 10 | 15 |
| Sb (μm) | — | 5 | — | — | 1.5 |
| Ratio of Sa to Sb used | 10:0 | 7:3 | 10:0 | 10:0 | 7:3 |
| Lamination ratio (%) | 1.2 | 2.7 | 0.8 | 30.2 | 21.5 |
| Diameter of flocculated particles (μm) | 20 | 25 | 30 | 90 | 81 |
| Black spot characteristic | Good | Good | Good | Poor | Poor |
| Luminance (Cd/m$^2$) | 1723 | 1720 | 1725 | 1683 | 1694 |

As shown in Table 1, in Examples 1 through 3 in which the lamination ratio is 10% or less and the size of flocculated particles in the light diffuser is 50 μm or less, the luminance characteristics are excellent and no black spots are found.

However, in Comparative Examples 1 and 2 in which flocculation and lamination occur to the light diffusing films, the luminance characteristics are poor and black spots are found, which are disadvantageous in view of applicability for various kinds of display devices.

While this invention has been particularly shown and described with reference to preferred embodiments thereof, it will be understood by those skilled in the art that various changes in form and details may be made therein without departing from the spirit and scope of the invention as defined by the appended claims.

INDUSTRIAL APPLICABILITY

The light diffusing film according to the present invention, which has a monodisperse light diffuser and a light diffusing layer consisting of a light diffuser and a binder resin on one plane of a base, in which the lamination ratio is 10% or less and the diameter of flocculated particles in the light diffuser is 50 μm or less, exhibits excellent luminance and thermal properties, so that it can be suitably used in various kinds of picture display devices, in particular, in a display device employing LED (light emitting diode) lamps or an LCD (liquid crystal display device) backlighting system.

What is claimed is:

1. A light diffusing film having, on at least one surface of a base film, a light diffusing layer made of an inorganic light diffuser selected from the group consisting of silica, zirconia, calcium carbonate, barium sulfate, glass and titanium dioxide; or organic light diffuser selected from the group consisting of urethane based resins, acryl based resins and vinyl chloride based resins, and a binder resin, wherein a lamination ratio is represented by the Formula 1 and a size of flocculated particles in a laminated light diffuser is represented by the Formula 2, wherein the light diffuser is made of two or more kinds of monodisperse particles, the following Formula 3 is satisfied, wherein an average particle diameter of the light diffuser is in the range of 5 to 50 μm:

$$\text{Lamination ratio} = \frac{\pi \times S(\mu m) \times \text{Number of laminated particles in a tested portion of the light diffuser}}{480\ \mu m \times 480\ \mu m} \times 100(\%) \leq 10\%,$$ [Formula 1]

$$\text{Diameter of flocculated particles} = S(\mu m) \times \text{Number of flocculated particles in a tested floc and in a tested portion of the light diffuser} \leq 50\mu m$$ [Formula 2]

wherein S denotes the average particle diameter of the light diffuser, $$Sa^{1/2} < Sb < Sa$$ [Formula 3]

wherein Sa denotes an average particle diameter of a relatively larger light diffuser particle and Sb denotes an average particle diameter of a relatively smaller diffuser particle.

2. The light diffusing film according to claim 1, wherein a coating amount of the light diffuser is in the range of 5 to 25 g/m$^2$.

3. A display device employing LED (light emitting diode) lamps or an LCD (liquid crystal display) backlight system, and comprising the light diffusing film according to claim 2.

4. A display device employing LED (light emitting diode) lamps or an LCD (liquid crystal display) backlight system, and comprising the light diffusing film according to claim 1.

* * * * *